March 12, 1946. G. W. DE BELL 2,396,318
SHOCK ABSORBING STRUT FOR AIRCRAFT
Filed Nov. 18, 1942 2 Sheets-Sheet 1
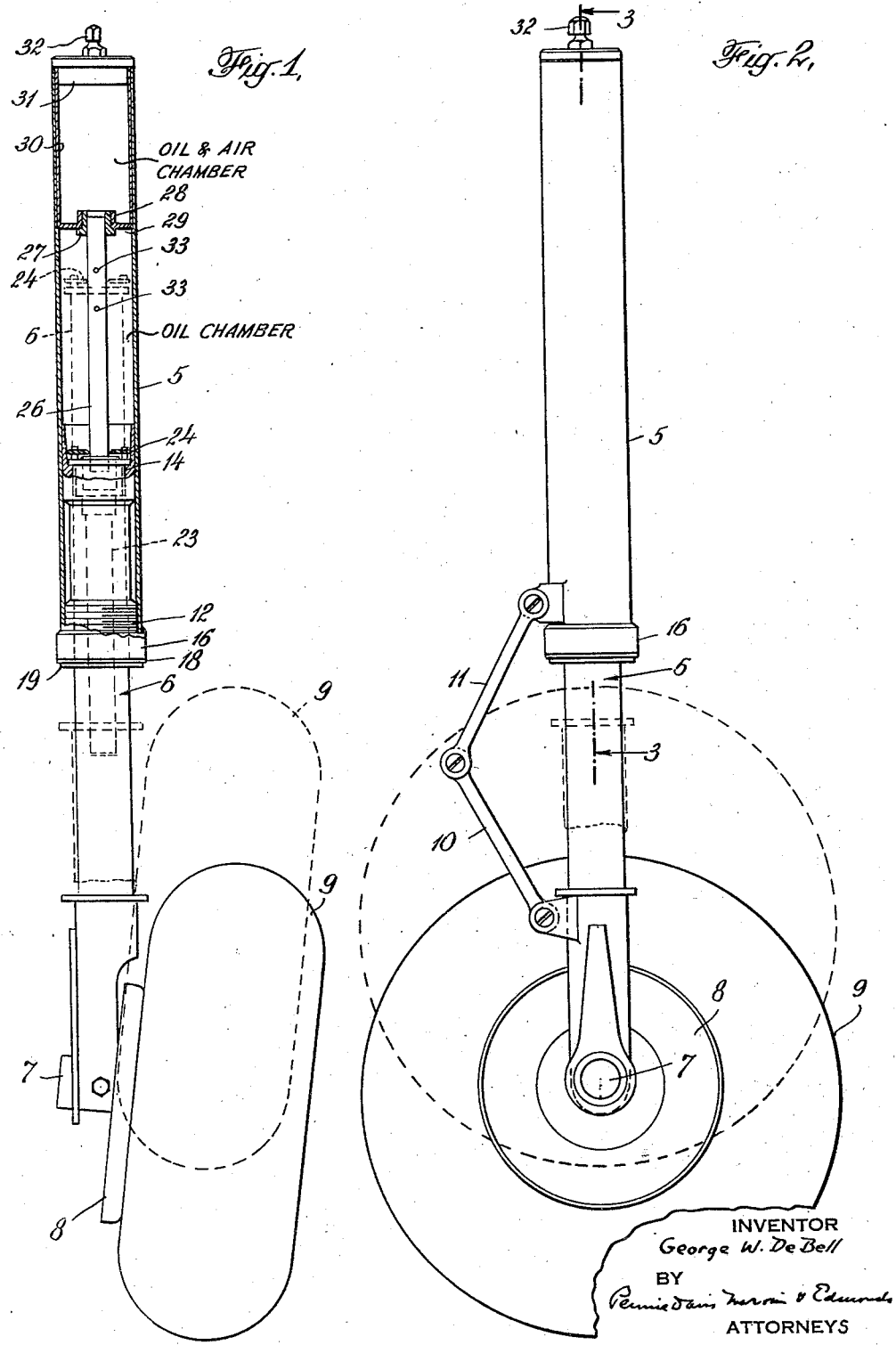
INVENTOR
George W. De Bell
BY
ATTORNEYS

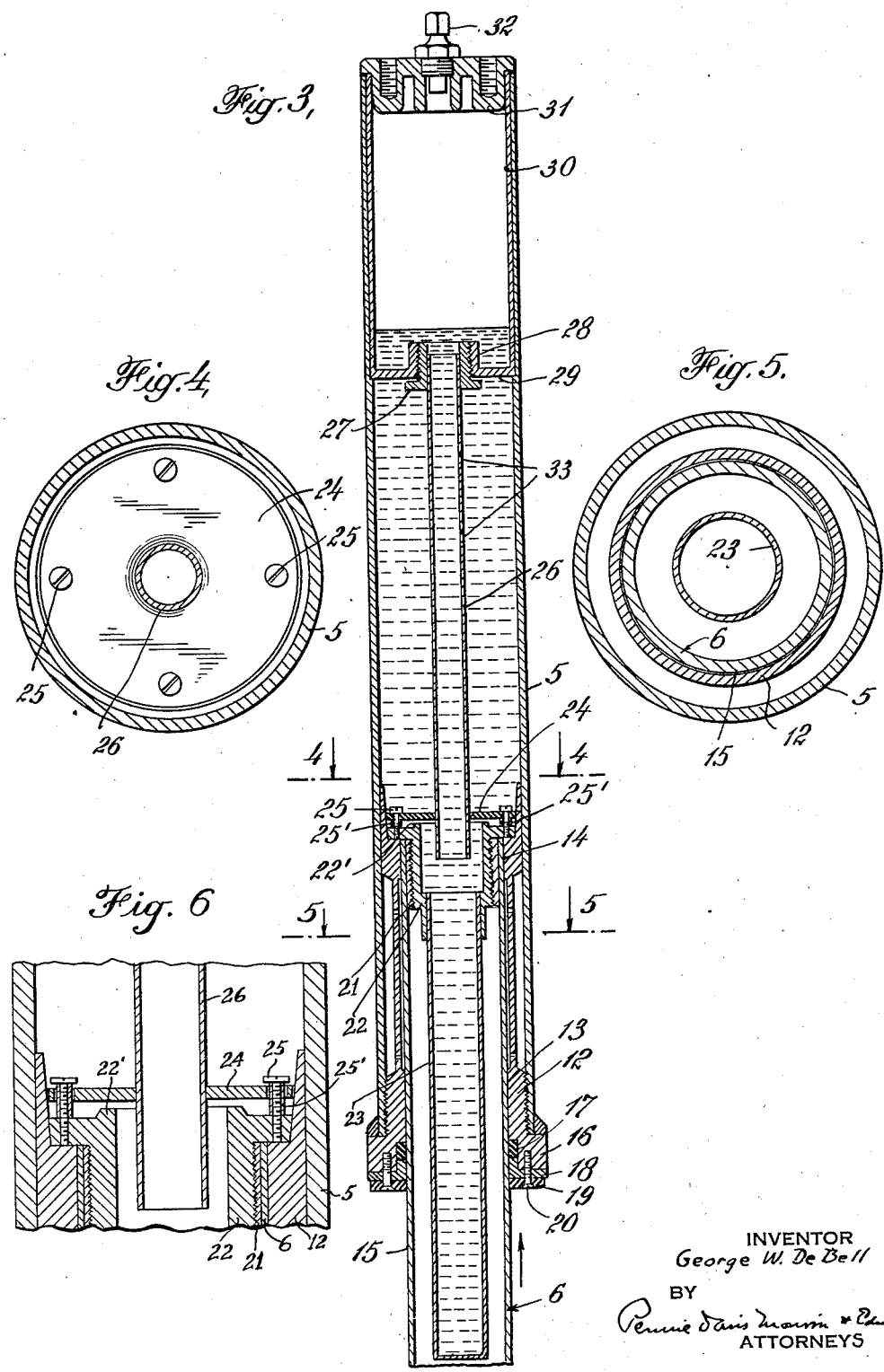

Patented Mar. 12, 1946

2,396,318

UNITED STATES PATENT OFFICE 2,396,318

SHOCK ABSORBING STRUT FOR AIRCRAFT

George W. De Bell, Stamford, Conn., assignor, by mesne assignments, to Reconstruction Finance Corporation Application November 18, 1942, Serial No. 466,083

6 Claims. (Cl. 267—64)

This invention relates to the shock absorbing struts for aircraft and particularly to a simplified construction adapted to absorb a major portion of the forces to which the landing wheels of the aircraft are subjected in landing.

Shock absorbing struts as heretofore constructed have required an excessive amount of machining to ensure smooth and satisfactory operation. Such machine work is expensive and particularly under present conditions introduces serious delay in the fabrication and delivery of finished parts for essential aircraft.

It is the object of the present invention to afford a substantial and satisfactory shock absorbing strut which can be assembled with the minimum of machine work requiring close limits.

Another object of the invention is the provision of a shock absorbing strut of novel construction providing for shock absorption by the passage of a liquid through metering openings and the cushioning effect of a gas under pressure.

Other objects and advantages of the invention will be apparent as it is better understood by reference to the following specification and accompanying drawings, in which:

Fig. 1 is an elevation partially in section illustrating the strut;

Fig. 2 is an elevation of the structure illustrated in Fig. 1;

Fig. 3 is an enlarged longitudinal section through a portion of the strut;

Fig. 4 is a section on the line 4—4 of Fig. 3;

Fig. 5 is a section on the line 5—5 of Fig. 3; and

Fig. 6 is a detail view of the valve shown in Figs. 1 and 3, and its associated parts.

Referring to the drawings, the strut comprises an outer cylinder 5 and an inner cylinder 6 arranged in telescoping relation. The cylinder 6 is provided with an axle 7 to receive a wheel 8 carrying a tire 9. A nut-cracker comprising pivoted arms 10 and 11 connects the cylinders 5 and 6 to maintain them in proper alignment.

The cylinder 5 is provided at its lower end with a bushing 12 threadedly secured therein. Aligned bearing surfaces 13 and 14 are formed in the bushing 12 which may be fabricated of any suitable metal, preferably bronze. The bearing surfaces 13 and 14 are machined to a relatively close fit with the outer surface 15 of the cylinder 6 which engages the bearings. These surfaces are the only parts of the structure which require careful machining within close limits, and consequently the structure can be produced at less cost than shock absorbing struts such as have been employed heretofore in aircraft construction.

At the lower end of the bushing 12, a flange 16 is provided, and a packing ring 17 is secured in place by a gland 18 held by a ring 19 and screws 20. The packing prevents the escape of oil as the cylinder 6 moves in and out of the cylinder 5.

At its upper end, the cylinder 6 is provided with a bushing 21 to which a member 22 is threadedly secured. From the member 22, a tubular member 23 depends within the cylinder 6. The member 22 at its upper end carries a ring which acts as a flap valve 24 secured by screws 25 and spacers 25'. These screws 25 are tightened firmly against the spacers 25' which allow the flap valve to rise a small distance from the valve seat 22' at the top of part 22. The inner edge of the flap valve engages a depending tubular member 26 which is secured to a threaded member 27 mounted in flange 28 of a diaphragm 29 near the upper end of the cylinder 5. Holes in the flap valve 24 for the spacers 25' are drilled oversize permitting the valve 24 to adjust itself in relation to tube 26 thus avoiding the necessity of perfect alignment of tube 26. The members 23 and 26 are adapted to telescope when the cylinder 6 moves inwardly in the cylinder 5.

The upper end of the cylinder 5 is provided with an inner casing 30 extending to a cap 31 which closes the upper end of the cylinder and forms, with the diaphragm 29, a gas chamber. A gas such as air under pressure may be introduced and maintained in the chamber through a suitable valve 32 similar to a "Schrader" valve commonly employed in automobile tires.

The member 26 is provided with a plurality of metering openings 33. The number and size of metering openings 33 is determined by experimentation, that is to say, with a given size of shock absorbing strut it is necessary to adjust the size and number of the openings to permit absorption of forces applied through the cylinder 6 at the proper rate to accomplish the desired result. Thus, slower or more rapid absorption of shock is determined by the number and size of the metering openings provided in the member 26.

The shock absorbing strut, including the members 23, 26 and the cylinder 5, are filled with a suitable liquid, preferably an oil, the viscosity of which is not materially altered under varying conditions of temperature. When the oil has been supplied, air or other gas under pressure is introduced to the chamber above the diaphragm 29 to the desired pressure. The amount of pressure maintained will depend upon the particular requirements of operation and may be varied over a wide range from slightly above atmospheric to 50 to 60 pounds or more. The shock absorbing strut is then in condition to accomplish its intended purpose.

Normally when no weight is resting on the tires 9, the strut is extended with the parts in the positions indicated in full lines in Figs. 1 and 2. When the aircraft lands and the weight plus the dynamic load thereof is carried by the tires 9, the cylinders 6 of each of the struts with which the aircraft is provided will be moved to some position such as indicated by the dotted lines in Figures 1 and 2. During this movement the member 6 including the parts attached thereto will telescope with member 5. The pressure is such that the flap valve 24 will rest on valve seat 22', thus forcing the oil in cylinder 5 above the flap valve 24 to pass through the metering holes 33, which retard the passage of the oil in accordance with the adjustment of the size and number of the metering openings. The oil thus enters the member 26 and is forced upwardly into the chamber above the diaphragm 29 against the pressure of the gas therein. Consequently, the landing shock is readily absorbed.

When the airplane again leaves the ground, the air in the chamber at the top of cylinder 5, which has been highly compressed, and the weight of the wheels 8 and tires 9 and of the cylinder 6 will cause the cylinder 6 to withdraw from the cylinder 5. The tendency of cylinder 5 to drop causes a pressure such that the flap valve 24 unseats itself from the valve seat 22' and allows the oil to flow past the edges of the flap valve 24 as well as through the opening at the end of the tube 26. This permits the oil to flow rapidly from above diaphragm 29 so that the strut is ready to absorb the next shock if the airplane wheels 9 touch the ground again.

The structure as described affords a relatively inexpensive and practical shock absorbing strut, the movement of which is cushioned in retracting by the restriction of the movement of the liquid and the effect of the gas under pressure above the liquid and the extension is rapid due to the unrestricted flow of liquid as well as the pressure exerted by the highly compressed gas. The structure is particularly desirable for the reason hereinbefore noted that fine machine work is not required on most of the parts. It is a relatively simple matter to properly align the bearings 13 and 14 and to finish the outer surface of the cylinder 6, thus ensuring smooth operation. The other parts of the device are readily constructed and assembled.

Various changes may be made in the form, arrangement and construction of the parts without departing from the invention or sacrificing the advantages thereof.

I claim:

1. A shock absorbing strut for aircraft, comprising telescoping cylinders, the outer cylinder having its outer end closed and containing a liquid, telescoping tubular members located in and supported, respectively, by the outer and inner cylinders, the outer of said telescoping tubular members containing a liquid and the inner of said members being adapted to be immersed in the liquid in the outer member, and a diaphragm in the outer cylinder, said diaphragm being spaced inwardly from the closed outer end of the outer cylinder to form a gas chamber at the outer end of the outer cylinder, said gas chamber communicating with the tubular member in the outer cylinder, the tubular member in the outer cylinder having openings of such size as to impede the free flow of liquid contained in the outer telescoping tubular member therethrough when said members are telescoped by a shock being applied to the strut, and thereby provide for absorbing at least a part of the shock.

2. A shock absorbing strut for aircraft, comprising telescoping cylinders, the outer cylinder having its outer end closed and containing a liquid, telescoping tubular members located in and supported, respectively, by the outer and inner cylinders, the outer of said telescoping members containing a liquid and the inner of said members being adapted to be immersed in the liquid in the outer member, a diaphragm in the outer cylinder, said diaphragm being spaced inwardly from the closed outer end of the outer cylinder to form a gas chamber at the outer end of the outer cylinder, said gas chamber communicating with the tubular member in the outer cylinder, the tubular member in the outer cylinder having openings of such size as to impede the free flow of liquid contained in the outer telescoping tubular member therethrough when said members are telescoped by a shock being applied to the strut, and thereby provide for absorbing at least a part of the shock, and valve means for holding gas under pressure in the gas chamber.

3. A shock absorbing strut for aircraft, comprising telescoping cylinders, a bushing having spaced aligned bearing surfaces secured within the inner end of the outer cylinder to engage the outer surface of the inner cylinder, and telescoping tubular members located within and supported by the respective cylinders, the tubular member within the outer cylinder having openings therein of such size as to impede the free flow of liquid contained in the telescoping tubular members therethrough when said members are telescoped by a shock being applied to the strut, and thereby provide for the absorbing of at least a part of the shock, the outer cylinder having a gas chamber at its outer end communicating with the tubular member therein, said gas chamber being closed except for its communication with said tubular member.

4. A shock absorbing strut for aircraft, comprising telescoping cylinders, a bushing having spaced aligned bearing surfaces secured within the inner end of the outer cylinder to engage the outer surface of the inner cylinder, the outer end of the outer cylinder being closed, a diaphragm extending across the outer cylinder inwardly from the outer end thereof and forming a gas chamber at the outer end of said cylinder, telescoping tubular members located within and supported by the respective cylinders, the outer of said telescoping tubular members containing a liquid and the inner of said members being adapted to be immersed in the liquid in the outer member, the telescoping tubular member supported within the outer cylinder extending inwardly from the diaphragm and communicating with the gas chamber, said telescoping tubular member having liquid openings therein of such size as to impede the free flow of liquid contained in the outer tubular member therethrough when said tubular members are telescoped by a shock being applied to the strut, and thereby provide for the absorbing of at least a part of the shock, and valve means radially outwardly of the tubular member supported by the outer cylinder for controlling, in part, the flow of liquid to and from the outer tubular member, said valve means preventing passage of liquid therethrough when the strut is under compression, but permitting flow of liquid therethrough when the strut is extending.

5. A shock absorbing strut for aircraft, comprising telescoping cylinders, a bushing having spaced aligned bearing surfaces secured within the inner end of the outer cylinder to engage the outer surface of the inner cylinder, the outer end of the outer cylinder being closed, a diaphragm extending across the outer cylinder inwardly from the outer end thereof and forming a gas chamber at the outer end of said cylinder, telescoping tubular members located within and supported by the respective cylinders, the outer of said telescoping tubular members containing a liquid and the inner of said members being adapted to be immersed in the liquid in the outer member, the telescoping tubular member supported within the outer cylinder communicating with said gas chamber, and valve means radially outwardly from the tubular member supported by the outer cylinder for controlling, in part, the flow of liquid to and from the outer tubular member, said valve means preventing passage of liquid therethrough when the strut is under compression but permitting the flow of liquid therethrough when the strut is extending.

6. A shock absorbing strut for aircraft comprising telescoping cylinders, the outer cylinder having its outer end closed, telescoping tubular members located in and supported, respectively, by the outer and inner cylinders, the outer cylinder and the telescoping tubular members containing a liquid, and a diaphragm extending transversely across the outer cylinder, the tubular member in the outer cylinder being connected at one end to said diaphragm, said diaphragm being spaced inwardly from the closed outer end of the outer cylinder to form a gas chamber at the outer end of that cylinder, said gas chamber communicating with the tubular member in the outer cylinder, so that on telescoping of the tubular members liquid may pass from said telescoping tubular members into said gas chamber.

GEORGE W. DE BELL.